United States Patent
Osoinach

(10) Patent No.: US 9,106,840 B2
(45) Date of Patent: Aug. 11, 2015

(54) DEVICES HAVING AUTOMATICALLY ADJUSTABLE POLARIZERS AND RELATED OPERATING METHODS

(71) Applicant: Bryce T. Osoinach, Phoenix, AZ (US)

(72) Inventor: Bryce T. Osoinach, Phoenix, AZ (US)

(73) Assignee: FREESCALE SEMICONDUCTOR INC., Austin, TX (US)

( * ) Notice: Subject to any disclaimer, the term of this patent is extended or adjusted under 35 U.S.C. 154(b) by 55 days.

(21) Appl. No.: 14/074,518

(22) Filed: Nov. 7, 2013

(65) Prior Publication Data

US 2015/0124148 A1    May 7, 2015

(51) Int. Cl.
*H04N 5/238* (2006.01)
*H04M 1/02* (2006.01)
*H04M 1/72* (2006.01)
*H04M 1/725* (2006.01)
*G02B 27/28* (2006.01)

(52) U.S. Cl.
CPC ............. *H04N 5/238* (2013.01); *H04M 1/0264* (2013.01); *H04M 1/72572* (2013.01); *G02B 27/286* (2013.01); *H04M 2250/12* (2013.01)

(58) Field of Classification Search
CPC ................................ H04N 5/238; G02B 27/26
USPC .......................................... 348/342; 356/364
See application file for complete search history.

(56) References Cited

U.S. PATENT DOCUMENTS

| 7,701,561 | B2* | 4/2010 | Zou et al. ..................... 356/73 |
| 8,059,275 | B1* | 11/2011 | Pinhasov ..................... 356/364 |
| 2002/0088927 | A1 | 7/2002 | Simchoni | |
| 2007/0162942 | A1 | 7/2007 | Hamynen et al. | |
| 2008/0246948 | A1 | 10/2008 | Van Schaik et al. | |
| 2009/0079982 | A1* | 3/2009 | Lefaudeux ................. 356/364 |
| 2010/0157082 | A1* | 6/2010 | Katerberg .................. 348/344 |
| 2012/0172061 | A1 | 7/2012 | Dods et al. | |

FOREIGN PATENT DOCUMENTS

| WO | 2007071290 A1 | 6/2007 |
| WO | 2013090843 A1 | 6/2013 |

* cited by examiner

*Primary Examiner* — Gevell Selby
(74) *Attorney, Agent, or Firm* — Ingrassia Fisher & Lorenz, P.C.

(57) ABSTRACT

Devices having adjustable polarizers and related operating methods are provided. An exemplary electronic device includes one or more sensing arrangements, a polarization arrangement including a polarizer, and a control module coupled to the one or more sensing arrangements and the polarization arrangement. The control module determines an angle for the polarizer based at least in part on output from the one or more sensing arrangements and operates the polarization arrangement to achieve the angle. In one or more exemplary embodiments, the angle corresponds to an orientation of the polarizer in a plane substantially orthogonal to a line-of-sight that is configured to result in the polarizer absorbing incident light rays emanating from the sun that are aligned with the line-of-sight.

17 Claims, 3 Drawing Sheets

US 9,106,840 B2

DEVICES HAVING AUTOMATICALLY ADJUSTABLE POLARIZERS AND RELATED OPERATING METHODS

TECHNICAL FIELD

Embodiments of the subject matter described herein relate generally to electronic devices, and more particularly, to electronic devices equipped for automatically adjusting the polarization angle of a polarizer and related operating methods.

BACKGROUND

Polarizers are often used in photography, for example, to filter out reflections, reduce glare, adjust contrast, and the like. Traditionally, this is achieved by placing a polarizing filter in a line-of-sight between the subject of a photograph and an image capturing device and manually adjusting the polarizing filter to achieve the desired effect within the resulting photograph. However, the use of such polarizing filters has typically been limited to more sophisticated users who are at least relatively familiar with advanced photography techniques and understand how to adjust other camera settings to compensate for the introduction of the polarizing filter in the line-of-sight. As a result, the desirable benefits of polarizing filters are effectively inaccessible to a relatively large segment of the general public that is unfamiliar with advanced photography techniques. Additionally, many compact cameras, mobile devices, and other electronic devices that are commonly used to take photographs in a point-and-shoot manner generally lack the capability to accommodate traditional polarizing filters.

BRIEF DESCRIPTION OF THE DRAWINGS

The various embodiments will hereinafter be described in conjunction with the following drawing figures, which are not necessarily drawn to scale, wherein like numerals denote like elements, and wherein.

DETAILED DESCRIPTION

Figure 1:
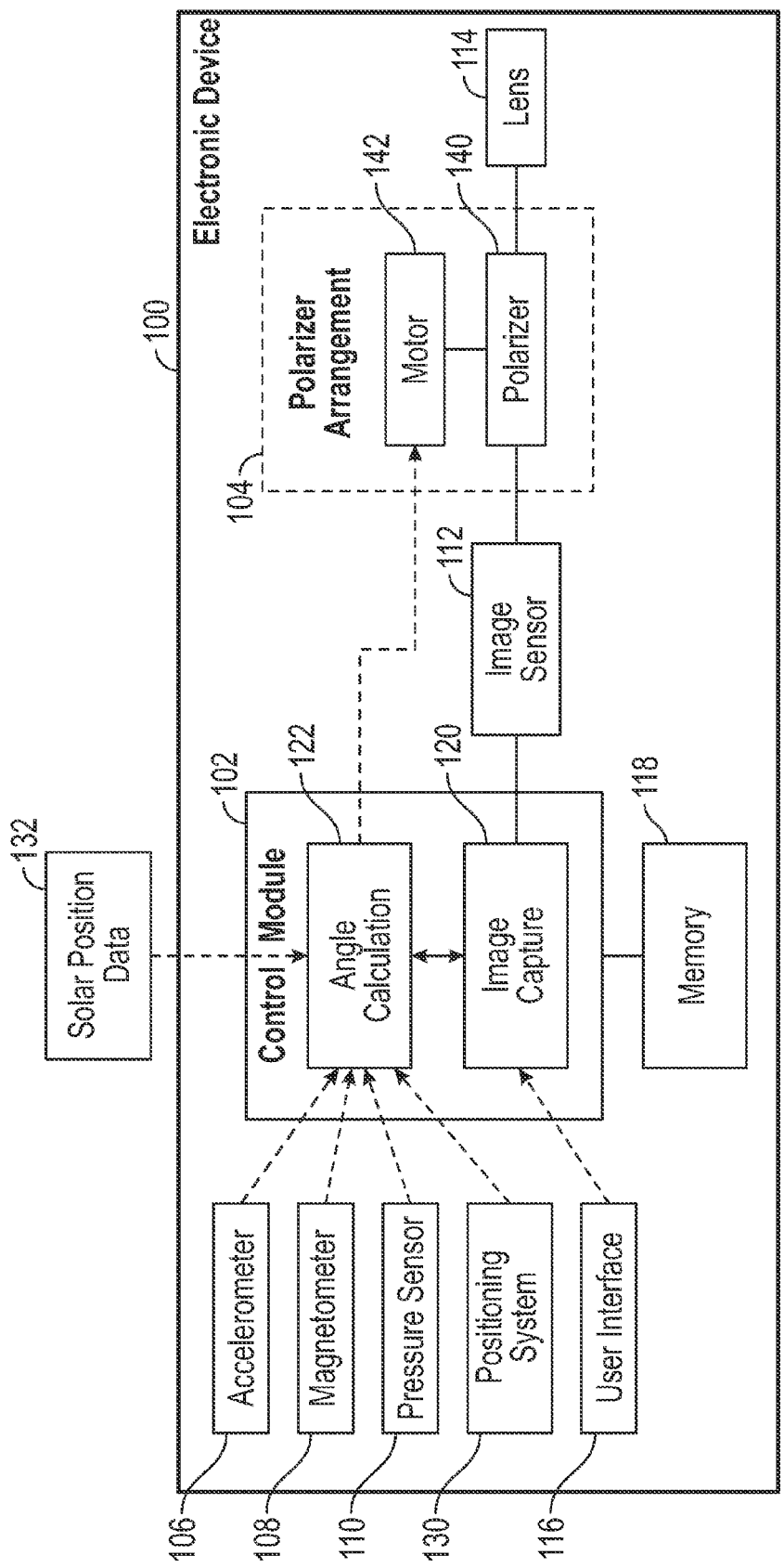
FIG. 1 depicts a block diagram of an exemplary electronic device in accordance with one or more embodiments of the invention.

The following detailed description is merely illustrative in nature and is not intended to limit the embodiments of the subject matter or the application and uses of such embodiments. Any implementation described herein as exemplary is not necessarily to be construed as preferred or advantageous over other implementations. Additionally, there is no intention to be bound by any expressed or implied theory presented in the preceding technical field, background, or the following detailed description.

Embodiments of the subject matter described herein relate to electronic devices that include an adjustable polarizer, where the polarizer is automatically adjusted to be oriented at a desired angle with respect to a line-of-sight aligned with the polarizer in a manner that is influenced by output from one or more sensing arrangements of the electronic device. As described in greater detail below, in exemplary embodiments, the current geographic position of the electronic device is utilized to determine the current position or orientation of the sun with respect to the electronic device. The output from one or more sensing arrangements of the electronic device is then utilized to calculate or otherwise determine the current orientation (e.g., tilt and/or heading) of the line-of-sight aligned with the polarizer with respect to the earth, and an angle or orientation of the sun with respect to the line-of-sight is calculated or otherwise determined based on the current position of the sun and the current orientation of the line-of-sight.

In exemplary embodiments, a direction of polarization for incident solar light rays is determined using the angle between the sun and the line-of-sight, and a corresponding polarization angle for the polarizer is determined that preferentially absorbs, attenuates, filters, or otherwise inhibits transmission of light rays having the direction of polarization corresponding to the incident solar light rays. Accordingly, direct polarized light from the sun is preferentially filtered from the remaining portion of the incident solar light rays that have been reflected or scattered by the sky or other objects, which, in turn, are preferentially transmitted through the polarizer and incident on an image capturing device aligned with the line-of-sight. As used herein, "polarizer angle," "angle of the polarizer," and variants thereof should be understood as referring to the rotational position or orientation of the polarizer in the plane that is substantially orthogonal to the direction of transmission (i.e., the direction aligned with the line-of-sight between a lens and an image capturing device upon which the lens directs incident light rays) that absorbs polarized light having a particular direction of polarization with respect to the direction of transmission. In exemplary embodiments, the polarization angle is determined to be the angle that absorbs solar light rays that are directly incident on the polarizer and/or the lens (e.g., solar light rays aligned with and propagating along the line-of-sight with the lens and an image capturing device). After the desired polarizer angle is determined, the polarizer is automatically rotated or otherwise adjusted within the plane orthogonal to the line-of-sight to achieve the desired polarization angle, and thereby filter polarized light from the sky. It should be noted that such filtering of polarized light from the sky is a relatively low contrast effect that does not readily lend itself to filtering by image processing.

As described in greater detail below, in one or more exemplary embodiments, in response to receiving an indication of a desire to capture an image, the current tilt and heading of the line-of-sight for an image capturing device are automatically determined based on the output from one or more sensing arrangements and the polarization angle is automatically determined based on the current time, and the current tilt and heading of the line-of-sight, and the current geographic position of the electronic device. Thereafter, the polarizer is automatically adjusted to achieve the polarization angle without any manual manipulation of the polarizer. Furthermore, as the electronic device is adjusted to frame the image, the polarization angle may be dynamically determined, such that the polarizer is automatically and dynamically adjusted as a user tilts, turns, rotates, or otherwise repositions the electronic device.

FIG. 1 depicts an exemplary embodiment of an electronic device 100 suitable for capturing an image, such as, for example, a digital camera, a compact camera, a point-and-shoot camera, a single-lens reflex (SLR) camera, a video camera, a webcam, a mobile phone, a tablet computer, a laptop computer, or the like. In exemplary embodiments, an electronic device 100 includes, without limitation, a control module 102 coupled to a polarization arrangement 104 and the output of one or more sensing arrangements 106, 108, 110. The electronic device 100 also includes an image capturing device 112 and a lens 114, with the polarizer 140 being aligned in a line-of-sight with the image capturing device 112 and the lens 114 so that the polarization angle of the polarizer 140 influences the amount of light received via the lens 114 that is incident on the image capturing device 112. It should be noted that although FIG. 1 depicts the polarizer 140 between the image capturing device 112 and the lens 114 for purposes of illustration, in alternative embodiments, the lens 114 may reside between the image capturing device 112 and the polarizer 140. The control module 102 is configured to operate the polarization arrangement 104 to adjust the polarization angle of the polarizer 140 in a manner that is influenced by the output of the sensing arrangements 106, 108, 110. In this regard, the illustrated electronic device 100 includes a user interface element 116 coupled to the control module 102 that is capable of receiving an input indicative of a desire to capture an image, wherein in response to receiving the indication from the user interface element 116, the control module 102 utilizes the output from the sensing arrangements 106, 108, 110 to determine an orientation of the electronic device 100 and/or lens 114 with respect to the earth. In exemplary embodiments, using device location information obtained from a positioning system 130, the control module 102 obtains solar position information from a solar position data source 132, and thereafter, uses the solar position information and the orientation of the electronic device 100 and/or lens 114 with respect to the earth to calculate or otherwise determine a polarization angle that preferentially attenuates polarized light emanating directly from the sun that is incident on the lens 114 while preferentially transmitting light emanating from the sun that has been reflected or scattered prior to incidence on the lens 114.

In exemplary embodiments, the control module 102 generally represents the hardware, circuitry, processing logic, and/or other components of the electronic device 100 configured to support operation of the electronic device 100 and the various tasks, operations, functions and/or processes described herein. Depending on the embodiment, the control module 102 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. The control module 102 includes or otherwise accesses a data storage element 118 (or memory) capable of storing programming instructions for execution by the control module 102, that, when read and executed, cause the control module 102 to create, generate, or otherwise facilitate one or more applications 120, 122 that support operation of the polarization arrangement 104 and the image capturing device 112, as described in greater detail below. Depending on the embodiment, the memory 118 may be realized as a random access memory (RAM), read only memory (ROM), flash memory, magnetic or optical mass storage, or any other suitable non-transitory short or long term data storage or other computer-readable media, and/or any suitable combination thereof.

In the embodiment of FIG. 1, the image capturing device 112 generally represents the components of the electronic device 100 that are configured to capture light incident on the image capturing device 112, whereby the captured light is translated or otherwise converted into a corresponding image data file that may be stored on the electronic device 100 (e.g., in memory 118) and/or displayed by the electronic device 100 (e.g., via an electronic display integrated with or communicatively coupled to the electronic device 100). In exemplary embodiments, the image capturing device 112 is realized as an electronic image sensor, such as, for example, a charge coupled device (CCD) or a complementary metal-oxide-semiconductor (CMOS) image sensor. Accordingly, for purposes of explanation, the image capturing device 112 may alternatively be referred to herein as an image sensor. The lens 114 generally represents any suitable optical element (or a combination thereof) that is configured to focus or otherwise cause external light that is incident on the lens 114 to converge towards the image sensor 112 along the line-of-sight between the lens 114 and the image sensor 112.

The polarizer 140 is aligned with the lens 114 or otherwise interposed in the line-of-sight with the lens 114 and the image sensor 112, and the polarizer 140 includes physical features and/or characteristics that are arranged or otherwise configured to transmit or otherwise pass incident light having a particular direction of polarization through the polarizer 140 to the image sensor 112. In this regard, rotating the angle of the polarizer 140 in the plane that is substantially orthogonal to the line-of-sight with the image sensor 112 varies the particular polarization of incident light that passes through the polarizer 140, and thereby, varies the amount of light that is incident on the image sensor 112. In one or more exemplary embodiments, the polarizer 140 is realized as a circular polarizer that includes a quarter wave plate disposed between the image sensor 112 and a linear polarizer so that the transmitted light that is incident on the image sensor 112 is circularly polarized to accommodate auto-focus, anti-aliasing, and/or other features supported by the image sensor 112. In accordance with one or more embodiments, the polarizer 140 is substantially planar and has a relatively small form factor so that the polarizer 140 can be integrated with the lens 114 and/or the image sensor 112 or otherwise integrated and contained within the housing of the electronic device 100.

In exemplary embodiments, the polarization arrangement 104 includes a motor 142 that is coupled to the polarizer 140, and the motor 142 is coupled to the control module 102 and capable of rotating the polarizer 140 in the plane that is substantially orthogonal to the line-of-sight aligned with the image sensor 112 and the lens 114 in response to commands from the control module 102. For example, the motor 142 may be realized as a brushless direct current (DC) motor or a stepper motor that precisely controls the rotational position or orientation of the polarizer 140 with respect to the line-of-sight in response to receiving a commanded number of motor steps from the control module 102. In exemplary embodiments, the form factor for the motor 142 is also relatively small so that the motor 142 can be integrated and contained within the housing of the electronic device 100.

Each respective sensing arrangement 106, 108, 110 within the electronic device 100 is configured to generate or otherwise output one or more electrical signals indicative of a characteristic that is sensed, measured, or otherwise quantified by the respective sensing arrangement. In this regard, the control module 102 is coupled to the output of the sensing arrangements 106, 108, 110 to receive the output electrical signals indicative of the respective characteristic that is sensed, measured, or otherwise quantified by a respective sensing arrangement 106, 108, 110 and determine a corresponding metric indicative of the sensed characteristic based on those electrical signals. In exemplary embodiments, a first sensing arrangement 106 is realized as an acceleration sensing arrangement (or accelerometer) that is configured to generate or otherwise output one or more electrical signals indicative of indicative of the strength and direction of an acceleration of the electronic device 100 along three axes that is sensed, measured, or otherwise quantified by the acceleration sensing arrangement. A second sensing arrangement 108 is realized as a magnetic sensing arrangement (or magnetometer) that is configured to output electrical signals indicative of the relative strength and direction along three axes of a sensed ambient magnetic field that is proximate to or otherwise in the vicinity of the electronic device 100. A third sensing arrangement 110 is realized as a pressure sensing arrangement (or pressure sensor) that is configured to output electrical signals indicative of the relative strength of the ambient pressure proximate to or otherwise in the vicinity of the electronic device 100.

In one or more exemplary embodiments, each of the sensing arrangements 106, 108, 110 is realized as a microelectromechanical system (MEMS) sensing arrangement. For example, the accelerometer 106 may be realized as a MEMS accelerometer achieved by exposing a substrate (or die) of semiconductor material to one or more semiconductor fabrication process steps to define a proof mass or another acceleration sensing arrangement in a region of the substrate. Similarly, the pressure sensor 110 may be realized as a MEMS pressure sensor achieved by exposing a substrate (or die) of semiconductor material to one or more semiconductor fabrication process steps to define a diaphragm region and a reference cavity on a die. In this regard, depending on the embodiment, each of the sensing arrangements 106, 108, 110 may be fabricated or otherwise provided on their own individual dies, which, in turn, may be mounted to one another to achieve a desired footprint for the sensing arrangements 106, 108, 110. For example, a magnetometer die may be stacked or otherwise mounted on an accelerometer die, which, in turn, is stacked or otherwise mounted on the pressure sensor die. In other embodiments, one or more of the sensing arrangements 106, 108, 110 may be fabricated on a common die. Furthermore, in some embodiments, the control module 102 and/or the memory 118 may be realized as an application-specific integrated circuit (ASIC) that is fabricated or otherwise formed on another semiconductor substrate or die, wherein the ASIC die may be stacked or otherwise mounted on one or more of the sensor dies to further reduce the overall footprint of the sensing arrangements 106, 108, 110 and the control module 102. For example, the sensing arrangements 106, 108, 110 may be fabricated on a common MEMS sensor die that is stacked or otherwise mounted on the ASIC die that includes the control module 102, so that the combined footprint of the control module 102 and the sensing arrangements 106, 108, 110 corresponds to the larger of the MEMS sensor die and the ASIC die.

Still referring to FIG. 1, the positioning system 130 generally represents a global positioning system (GPS) receiver or another suitable means for determining the geographic location of the electronic device 100, such as, for example, latitudinal coordinates, longitudinal coordinates, and/or altitude information. In some embodiments, the positioning system 130 may be realized as a component of the electronic device 100 that determines the geographic location of the electronic device 100 by performing triangulation or another similar technique. Additionally, the positioning system 130 may generate or otherwise provide an indication of the current time of day. In exemplary embodiments, the positioning system 130 has a relatively small form factor so that it is integrated and contained within the housing of the electronic device 100.

In the illustrated embodiment of FIG. 1, the solar position data source 132 generally represents a component that is configured to store or otherwise maintain information that identifies, describes, or otherwise indicates the position of the sun relative to the earth. In accordance with one or more embodiments, the solar position data source 132 is realized as an external database or another resource that is capable of being communicatively coupled to the electronic device 100 and/or the control module 102 via a communications network, such as, for example, a wired and/or wireless computer network, a cellular network, a mobile broadband network, a radio network, the Internet, or the like. In other embodiments, the solar position data source 132 may be realized as another electronic device or a data storage element, such as a removable disk or another external memory element, that may be inserted or otherwise coupled to the control module 102 (e.g., via a corresponding interface on the electronic device 100), thereby allowing the control module 102 to read or otherwise obtain the solar position information from the solar position data source 132 and/or store the solar position information in memory 118. For example, the electronic device 100 may include one or more ports or slots, such as a universal serial bus (USB) port, a memory card slot, or the like, capable of receiving or otherwise interfacing with the solar position data source 132. In this regard, in various embodiments, the solar position information that would otherwise be maintained by the solar position data source 132 may be downloaded to or otherwise stored on the internal memory 118 of the electronic device 100 (e.g., by periodically accessing an external network to update the stored solar position information on the memory 118), in which case, the solar position data source 132 may not be present and/or communicatively coupled to the electronic device 100 at all times.

The user interface 116 generally represents the hardware, circuitry, and/or other components that provide a physical interface to/from the electronic device 100 for receiving input and/or output from a user. For example, the user interface 116 may include one or more buttons, keys, touch panels (or touchscreens), sensors, transducers, or other suitable devices adapted to receive input from a user. In exemplary embodiments described herein, a user of the electronic device 100 manipulates the electronic device 100 to direct the lens 114 towards a desired image subject and then manipulates the user interface 116 to provide an indication of a desire to capture an image via the lens 114.

In the illustrated embodiment of FIG. 1, the image capturing application 120 generally represents a software module or another feature that is generated or otherwise implemented by the control module 102 that is configured to receive the indication of a desire to capture an image from the user interface 116 and initiate operation of the image sensor 112 to obtain an image that is representative of the light rays incident on the image sensor 112. In various embodiments, the image capturing application 120 may also be coupled to the lens 114 and configured to support or otherwise provide any number of features and/or functionality associated with digital photography, such as, for example, anti-aliasing or other digital filtering, auto-focus, image compression, and the like. The polarization angle calculation application 122 generally represents another software module or feature that is generated or otherwise implemented by the control module 102 that is coupled to the image capturing application 120 to receive indication of a desire to operate the polarization arrangement 104 to adjust the polarization angle for the polarizer 140 and achieve a desired attenuation of incident light rays that are transmitted to the image sensor 112.

As described in greater detail below in the context of FIG. 2, the angle calculation application 122 identifies or otherwise determines the current orientation of the electronic device 100 and/or the lens 114 based on the measured acceleration output from the accelerometer 106 and the measured magnetic field output from the magnetometer 108 and identifies or otherwise determines the current geographic location and altitude of the electronic device 100 based on the location information from the positioning system 130 and the measured pressure output from the pressure sensor 110. Based on the current geographic location, altitude, device orientation, and time of day, the angle calculation application 122 obtains or otherwise determines the current angle of the sun with respect to the line-of sight aligned with the image sensor 112, the lens 114, and the polarizer 140 using the solar position information obtained from the solar position data source 132. Based on the angle of the sun with respect to the line-of sight aligned with the image sensor 112, the angle calculation application 122 calculates or otherwise determines a polarization angle for the solar light rays that are incident on the lens 114. Based on the polarization angle for the incident solar light rays, the angle calculation application 122 calculates or otherwise determines a corresponding angle for the physical features of the polarizer 140 in the plane orthogonal to the line-of-sight with the image sensor 112 that absorbs or otherwise inhibits transmission of the incident solar light rays having that polarization angle, thereby attenuating the incident solar light rays that are propagating along the line-of-sight for the image sensor 112. For purposes of explanation, the calculated angle for the physical features of the polarizer 140 in the plane orthogonal to the line-of-sight with the image sensor 112 that attenuates the incident solar light rays is alternatively referred to herein as the attenuating polarization angle. In one embodiment, the attenuating angle is chosen to be the polarization angle for the polarizer 140 that maximizes attenuation of incident solar light rays propagating along the line-of-sight for the image sensor 112.

It should be understood that FIG. 1 is a simplified representation of an electronic device 100 for purposes of explanation and is not intended to limit the scope or applicability of the subject matter described herein in any way. In this regard, although FIG. 1 depicts the angle calculation application 122 as being separate from the image capturing application 120, in practice, the features and/or functionality of the angle calculation application 122 may be integrated into or otherwise implemented by the image capturing application 120, in which case, a separate angle calculation application 122 may not be present. Furthermore, practical embodiments of the electronic device 100 may include any number of additional components and/or elements configured to support or otherwise provide any number of features and/or functionality for the electronic device 100.

Figure 2:
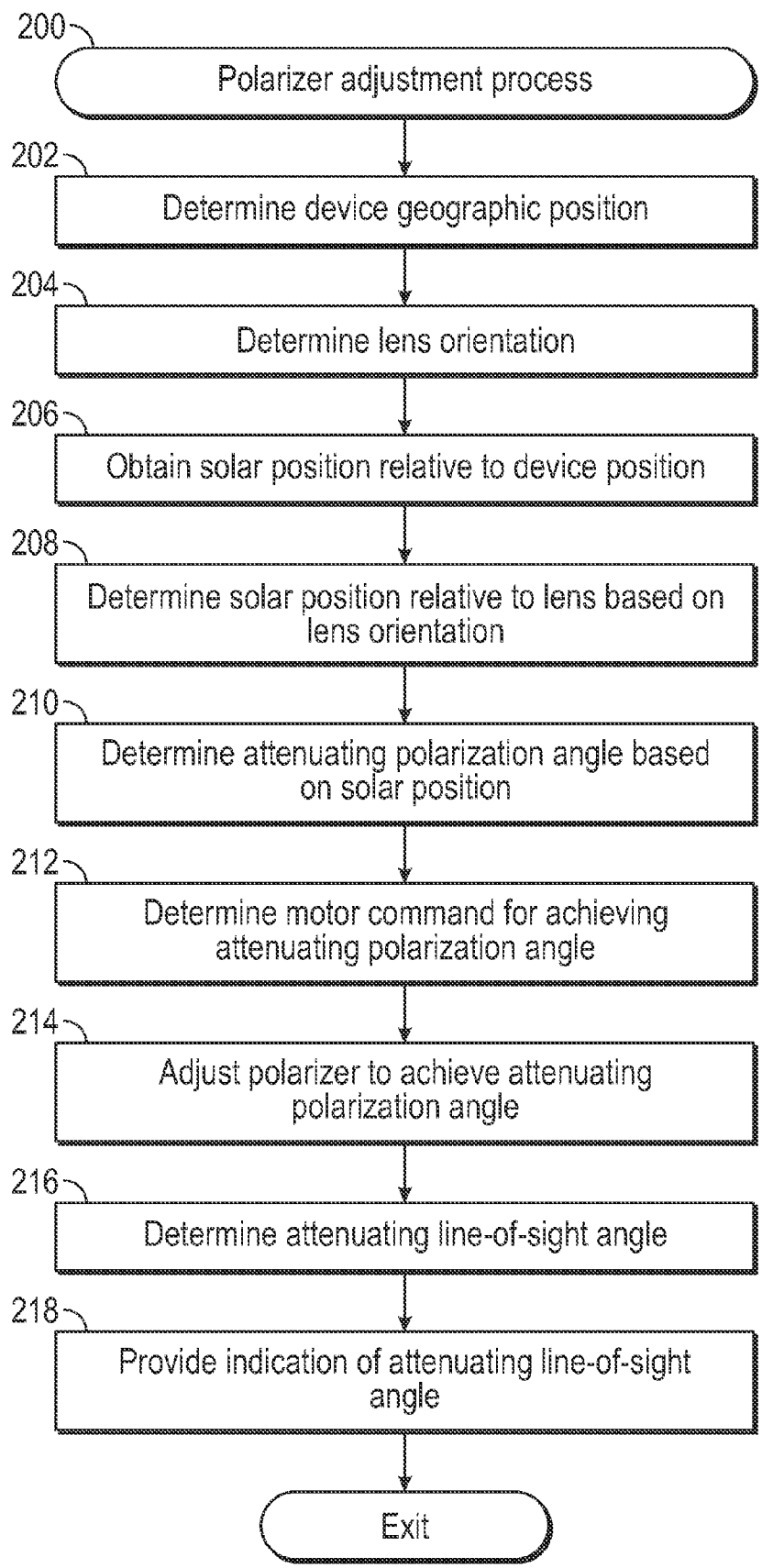
FIG. 2 depicts a flow diagram of an exemplary polarizer adjustment process suitable for implementation by the electronic device of FIG. 1 in accordance with one or more embodiments of the invention.

FIG. 2 depicts an exemplary embodiment of a polarizer adjustment process 200 suitable for implementation by an electronic device to automatically adjust the polarization angle of a polarizer to attenuate solar light rays that are incident on a lens of the electronic device. The various tasks performed in connection with the illustrated process 200 may be performed by hardware, software and/or firmware executed by processing circuitry or other suitable hardware, or any combination thereof. For illustrative purposes, the following description may refer to elements described above in connection with FIG. 1. In practice, portions of the polarizer adjustment process 200 may be performed by different elements of the electronic device 100, such as, for example, the control module 102, the polarization arrangement 104, one or more of the sensing arrangements 106, 108, 110, the image sensor 112, the memory 118, the image capturing application 120, the angle calculation application 122, the positioning system 130, and/or the motor 142. It should be appreciated that practical embodiments of the polarizer adjustment process 200 may include any number of additional or alternative tasks, the tasks need not be performed in the illustrated order and/or the tasks may be performed concurrently, and/or the polarizer adjustment process 200 may be incorporated into a more comprehensive procedure or process having additional functionality not described in detail herein. Moreover, one or more of the tasks shown and described in the context of FIG. 2 could be omitted from a practical embodiment of the polarizer adjustment process 200 as long as the intended overall functionality remains intact.

Referring to FIG. 2, and with continued reference to FIG. 1, in one or more exemplary embodiments, the polarizer adjustment process 200 begins or otherwise initializes in response to receiving an indication of a desire to capture an image received from a user of the electronic device 100. For example, the user of the electronic device 100 may orient, point, or otherwise direct the lens 114 toward a desired image subject and manipulate the user interface 116 to interact with the image capturing application 120 on the electronic device 100 to provide an indication of a desire to capture an image. In some embodiments, the polarizer 140 is capable of being selectively inserted in the line-of-sight of the image sensor 112, in which case, the polarizer adjustment process 200 may only be performed after selectively inserting the polarizer 140 in the line-of-sight with the lens 114 and image sensor 112 when an operating mode or other settings of the image capturing application 120 dictate that the polarizer 140 should be utilized or in response to receiving an indication of a desire to use the polarizer 140 from the user of the electronic device 100. Thereafter, in response to receiving an indication from the user interface 116 of a desire to capture an image, the image capturing application 120 commands, signals, or otherwise instructs the angle calculation application 122 to automatically adjust the polarizer 140 to the appropriate attenuating polarization angle before the image capturing application 120 commands, signals, or otherwise instructs the image sensor 112 to capture the image.

In response to receiving an indication to adjust the polarizer, the polarizer adjustment process 200 calculates, determines, or otherwise identifies the current geographic position of the electronic device with respect to the earth (task 202). In this regard, the angle calculation application 122 identifies the current geographic location and altitude of the electronic device 100 with respect to the earth. In exemplary embodiments, the angle calculation application 122 determines the current geographic position of the electronic device 100 by obtaining latitudinal and longitudinal coordinates corresponding to the current geographic location of the electronic device 100 from the positioning system 130. In exemplary embodiments, the angle calculation application 122 calculates or otherwise determines the current altitude of the electronic device 100 based at least in part on the measured ambient pressure obtained from the pressure sensor 110. In this regard, based on the measured ambient pressure, the angle calculation application 122 calculates or otherwise determines a corresponding altitude that results in the measured ambient pressure. In alternative embodiments, the angle calculation application 122 may obtain a current device altitude that is estimated or otherwise determined by the positioning system 130. Furthermore, in some embodiments, the angle calculation application 122 calculates or otherwise determines the current altitude of the electronic device 100 as a function of the measured ambient pressure obtained from the pressure sensor 110 and the device altitude obtained from the positioning system 130, for example, by averaging the device altitude obtained from the positioning system 130 with the altitude that corresponds to the measured ambient pressure.

In response to receiving an indication to adjust the polarizer, the polarizer adjustment process 200 also calculates, determines, or otherwise identifies the current orientation of the lens of the electronic device with respect to the earth (task 204). In this regard, the angle calculation application 122 determines the orientation of the line-of-sight of the image sensor 112 via the polarizer 140 and the lens 114. In exemplary embodiments, the angle calculation application 122 identifies the current tilt (or angle) of the lens 114 of the electronic device 100 with respect to the surface of the earth and the current heading (or direction) that the lens 114 is facing with respect to the earth. In exemplary embodiments, the angle calculation application 122 obtains or otherwise determines the three-dimensional acceleration of the electronic device 100 that is sensed or otherwise measured by the accelerometer 106, calculates or otherwise determines a direction of the gravitational force based on the measured device acceleration, and calculates or otherwise determines the tilt of the electronic device 100, and thereby, the tilt of the lens 114 based on the direction of gravity with respect to the electronic device 100. In alternative embodiments, the electronic device 100 may include or otherwise incorporate an inclinometer or another similar component in lieu of or in addition to the accelerometer 106 that provides an output indicative of the measured tilt of the electronic device 100.

In a similar manner, in exemplary embodiments, the angle calculation application 122 obtains or otherwise determines the three-dimensional magnetic field that is sensed or otherwise measured by the magnetometer 108 and calculates or otherwise determines the heading (or direction) for the line-of-sight of the lens 114 based on the measured magnetic field relative to the electronic device 100 using the current tilt of the electronic device 100 and/or the current direction of gravity with respect to the electronic device 100 to compensate for the orientation of the magnetometer 108 with respect to the earth. In this regard, in some embodiments, the angle calculation application 122 may utilize the geographic location information obtained from the positioning system 130 to compensate for variations in the earth's magnetic field and improve the accuracy of the calculated lens heading. For example, global magnetic field data may be stored or otherwise maintained in memory 118, by the solar position data source 132, or another magnetic field data source communicatively coupled to the control module 102, wherein the angle calculation application 122 utilizes the current geographic location of the electronic device 100 to obtain magnetic field data for the device's current geographic location and utilize the magnetic field data for the device's current geographic location to adjust the measured magnetic field value obtained from the magnetometer 108 to compensate for variations in the earth's magnetic field before determining the current heading of the lens 114 based on that compensated measured magnetic field value.

In exemplary embodiments, the polarizer adjustment process 200 continues by obtaining the current solar position relative to the electronic device based on the current geographic position of the electronic device and calculating or otherwise determining the current solar position relative to the line-of-sight for the lens of the electronic device based on the current lens orientation (tasks 206, 208). In this regard, using the current geographic location coordinates obtained from the positioning system 130 and the current time of day, the angle calculation application 122 accesses the solar position data source 132 to retrieve or otherwise obtain solar position information indicative of the current position of the sun relative to the current geographic location of the electronic device 100. After obtaining the current position of the sun relative to the current geographic location of the electronic device 100, in some embodiments, the angle calculation application 122 utilizes the current altitude of the electronic device 100 to calculate an adjusted current solar position relative to the electronic device 100. Based on the current solar position relative to the geographic position of the electronic device 100, the current heading of the lens 114, and the current tilt of the lens 114, the angle calculation application 122 calculates or otherwise determines a current solar position relative to the lens 114. In this regard, the current solar position relative to the lens 114 corresponds to the angle between the line-of-sight of the image sensor 112 and the sun.

The polarizer adjustment process 200 continues by calculating or otherwise determining an attenuating polarization angle that attenuates incident solar light rays based on the current solar position relative to the lens and determining a motor command configured to adjust or otherwise rotate the polarizer of the electronic device to achieve that attenuating angle (tasks 210, 212). As described above, after determining the solar position relative to the current orientation of the lens 114, the angle calculation application 122 determines the polarization angle for the solar light rays emanated by the sun from its current angle relative to the line-of-sight of the image sensor 112 that will be incident on the lens 114. Based on the polarization angle for the incident solar light rays propagating along the line-of-sight, the angle calculation application 122 identifies or otherwise determines an angle for the physical features of the polarizer 140 in the plane orthogonal to the line-of-sight between the image sensor 112 and the lens 114, such that the polarizer 140 absorbs or otherwise inhibits transmission of the incident light rays having the polarization angle corresponding to the incident solar light rays that are emanated directly from the sun and propagating along the line-of-sight. After determining the desired attenuating angle for the polarizer 140, the angle calculation application 122 determines a corresponding motor command for the motor 142 that will rotate or otherwise orient the polarizer 140 by the angular difference between the current orientation (or angle) of the polarizer 140 in the plane orthogonal to the image sensor 112 line-of-sight and the desired attenuating angle. In this regard, the angle calculation application 122 may obtain a current angle for the polarizer 140 and calculate or otherwise determine an amount by which the motor 142 needs to be rotated (e.g., a number of motor steps or another rotational increment) to rotate the polarizer 140 by the angular difference between the current polarizer angle and the attenuating angle. For example, when the motor 142 is a stepper motor, the angle calculation application 122 may calculate the angular displacement between the desired attenuating angle and the current polarizer angle and multiply the angular displacement by a conversion factor to convert the angular displacement of the polarizer 140 to a corresponding number of motor steps for the motor 142. In some embodiments, the angle calculation application 122 may obtain the current polarizer angle based on the output of a rotational position sensor associated with the motor 142 and/or the polarizer 140. In alternative embodiments, the current angle for the polarizer 140 may be stored in the memory 118 after each time the orientation of the polarizer 140 is adjusted, such that the angle calculation application 122 may obtain the current polarizer angle from memory 118.

After determining a motor command, the polarizer adjustment process 200 continues by automatically adjusting or otherwise rotating the polarizer of the electronic device to achieve the desired attenuating angle before operating the image capturing device to capture an image corresponds to the light rays transmitted through the polarizer that are incident on the image capturing device (task 214). In this regard, once the angle calculation application 122 determines the motor command, the angle calculation application 122 automatically operates the motor 142 to achieve the commanded rotation or otherwise provides the motor command to the motor 142, which, in turn, automatically executes the motor command received from the angle calculation application 122 (e.g., via a motor controller and other drive electronics). After the motor 142 is operated to rotate the polarizer 140, the angle calculation application 122 may provide a notification to the image capturing application 120 that the polarizer 140 is oriented at the desired attenuating angle for the current lens orientation, whereby in response to receiving the notification, the image capturing application 120 automatically operates the image sensor 112 to capture an image of the light rays that are incident on the image sensor 112. Prior to capturing the image, the image capturing application 120 may automatically adjust one or more settings of the image sensor 112 and/or the lens 114 to compensate for the polarizer 140 being positioned in the line-of-sight with the image sensor 112, such as, for example, aperture settings, shutter speed settings, film speed settings, or the like. The captured image consists of data indicative of the incident light rays across the image sensor 112 that have been filtered and transmitted by the polarizer 140. Thus, in some embodiments, the light rays that are incident on the image sensor 112 may include substantially zero solar light rays propagating along the line-of-sight of the image sensor 112 that are directly incident on the lens 114 and/or the polarizer 140 by virtue of the automatic adjustment of the polarizer 140 when the attenuating angle maximizes attenuation of such directly incident solar light rays. The captured image may be stored or otherwise maintained in memory 118 for presentation to the user (e.g., on an electronic display device associated with the electronic device 100) or subsequent image processing.

In accordance with one or more embodiments, the polarizer adjustment process 200 calculates or otherwise determines an attenuating line-of-sight angle that attenuates incident solar light rays based on the current solar position and provides an indication of the attenuating line-of-sight angle (tasks 216, 218). In such embodiments, based on the solar position relative to the current orientation of the lens 114, the angle calculation application 122 may determine the line-of-sight for the image sensor 112 and/or the lens 114 that will increase the attenuation of the directly incident solar light rays in combination with the adjustment of the polarizer angle. For example, a line-of-sight orthogonal to the line-of-sight between the solar position and the location of the electronic device 100 may allow for increased attenuation of the directly incident solar light rays. In this regard, based on the current orientation of the electronic device 100, the angle calculation application 122 and/or the control module 102 may generate or otherwise provide a graphical indication (e.g., on a display device associated with the electronic device 100) that indicates how a user should adjust the line-of-sight of the image sensor 112 and/or the lens 114 relative to the current line-of-sight and/or the current orientation of the electronic device 100. For example, the angle calculation application 122 and/or the control module 102 may generate or otherwise provide a graphical indication that indicates which direction the user of the electronic device 100 should pan and/or tilt the electronic device 100 to increase the angle of the line-of-sight of the image sensor 112 and/or the lens 114 relative to the line-of-sight between the solar position and the location of the electronic device 100. In this manner, the user may be notified of how he or she can improve attenuation of the directly incident solar light rays by reorienting the electronic device 100 in conjunction with the resulting automatic adjustment of the polarizer angle in response to reorientation of the electronic device 100.

It should be noted that in exemplary embodiments, the polarizer adjustment process 200 is continuously and/or periodically repeated in the absence of receiving indications from the user interface 116 to dynamically adjust the angle of the polarizer 140 as the electronic device 100 moves. For example, as a user is aligning the electronic device 100 to focus the lens 114 on a particular target and achieve a desired orientation and/or framing of the image target, the angle calculation application 122 may continuously and/or periodically obtain updated acceleration and magnetic field measurements from the sensing arrangements 106, 108 to dynamically determine updated values for the tilt and/or heading of the lens 114, which, in turn, are used to dynamically update the desired attenuating angle and automatically adjust the angle of the polarizer 140 as the user is attempting to frame the image target. Additionally, as the user moves around and time elapses, the angle calculation application 122 may continuously and/or periodically obtain updated geographic location information and/or time information from the positioning system 130, updated pressure sensor measurements from the pressure sensor 110, and/or updated solar position information from the solar position data source 132 to dynamically update the current solar position relative to the electronic device 100, which, in turn, is used to dynamically update the desired attenuating angle and automatically adjust the angle of the polarizer 140.

Figure 3:
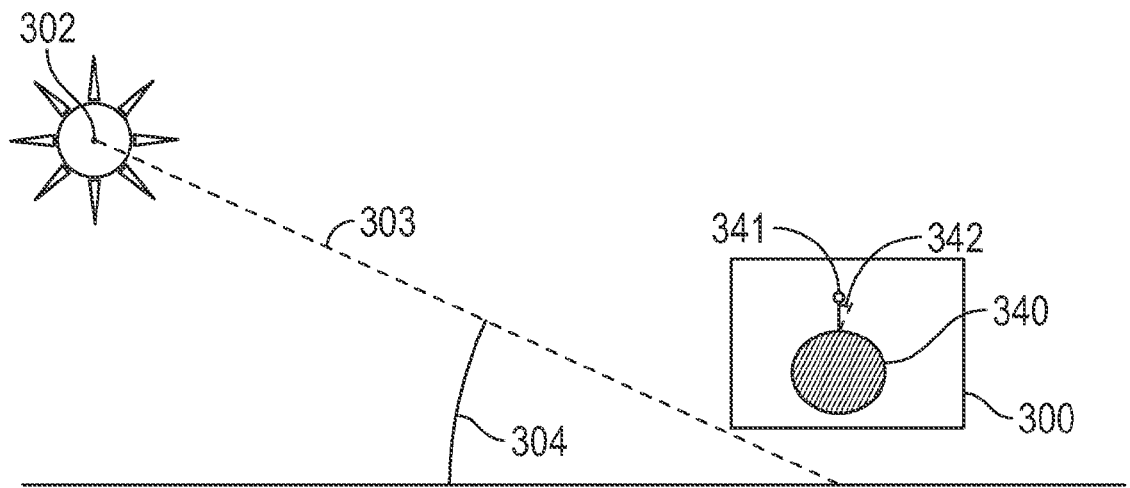
FIGS. 3-4 illustrate dynamic automatic adjustment of the polarization angle for a polarizer in an electronic device in conjunction with the polarizer adjustment process of FIG. 2 in accordance with one or more embodiments of the invention.
Figure 4:
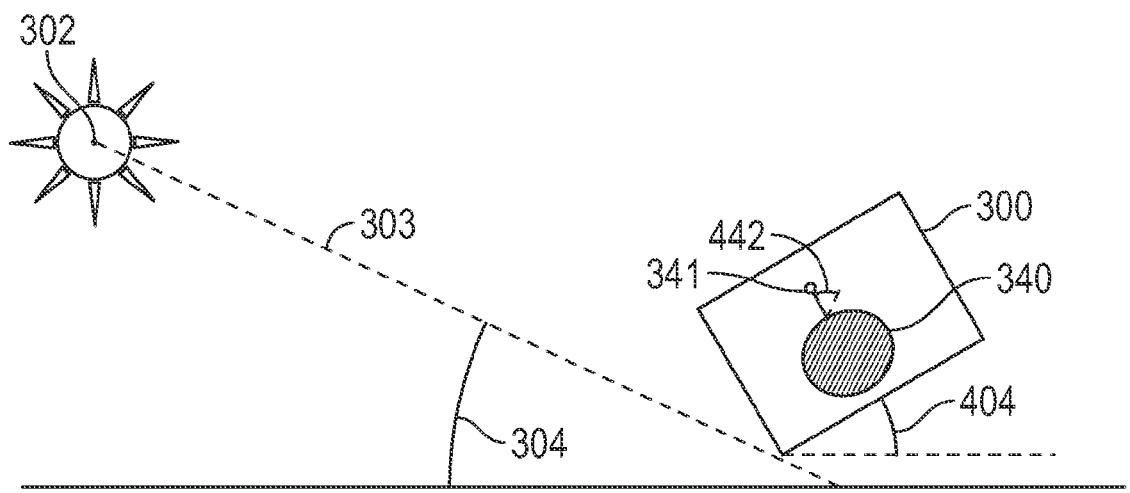

FIGS. 3-4 illustrate the dynamic automatic adjustment of the angle of a polarizer 340 of an electronic device 300 in accordance with one exemplary embodiment of the polarizer adjustment process 200. As described above, the angle calculation application 122 determines a current solar position relative to the location of the electronic device 300 as an angle 304 relative to the horizon for the line-of-sight 303 between the current position 302 of the sun and the current location of the electronic device 300. Based on the current angle 304 of the sun with respect to the electronic device 300 and the current orientation of the electronic device 300, the angle calculation application 122 determines a corresponding attenuating polarization angle 342 for the polarizer 340 relative to a reference polarizer orientation 341 and automatically rotates or otherwise adjusts the polarizer 340 to achieve the attenuating polarization angle 342 from the reference polarizer orientation 341. As illustrated in FIG. 4, in response changes to the orientation of the electronic device 300 and/or the image sensor line-of-sight, the angle calculation application 122 determines an updated attenuating polarization angle 442 for the polarizer 340 that accounts for the change in the orientation of the electronic device 300 and/or the image sensor line-of-sight and automatically rotates or otherwise adjusts the polarizer 340 from the previous attenuating polarization angle 342 to achieve the updated attenuating polarization angle 442 relative to the reference polarizer orientation 341.

For example, in the illustrated embodiment of FIGS. 3-4, when the electronic device 300 is level with the horizon, the polarizer angle 342 relative to the reference orientation 341 may be substantially equal to the current solar angle 304 relative to the horizon. In response to the electronic device 300 and/or the image sensor line-of-sight being tilted by an angle 404 relative to the horizon, the updated attenuating polarization angle 442 for the polarizer 340 may be substantially equal to the sum of the current solar angle 304 and the current device angle 404 to account for the change in the orientation of the electronic device 300 and/or the image sensor line-of-sight with respect to the line-of-sight 303 between the current position 302 of the sun and the location of the electronic device 300. In this regard, the polarization angle for the polarizer 340 corresponds to the current solar angle 304 that is compensated for the orientation of the electronic device 300. It should be noted FIGS. 3-4 depict a simplified representation of the polarizer adjustment process 200, and practical embodiments of the polarizer adjustment process 200 may also account for rotation in three dimensions (e.g., changes in pitch and yaw of the electronic device 300 in addition to roll) when determining the attenuating polarization angle.

One benefit of the subject matter described herein is that a polarizer may be automatically adjusted without any manual input and/or interaction. Thus, a user of an electronic device need not be familiar with how to use polarizing filters, how to adjust other camera settings to compensate for the user of a polarizing filter, and/or how to optimally orient the polarizing filter for the current angle of the sun with respect to the electronic device. Additionally, as the user repositions or otherwise reorients the electronic device to frame or otherwise alter the composition of the image, the polarizer may be dynamically adjusted in an automated manner, thereby accommodating point-and-shoot applications. Furthermore, the electronic device may provide an indication of how the user can adjust the orientation to achieve a line-of-sight, which further improves the effectiveness of the polarizer in conjunction with the automatic polarizer adjustment. It should be noted that although the subject matter is described herein in the context of attenuating directly incident solar light rays propagating along the line-of-sight of the image sensor, in alternative embodiments, the subject matter described herein may be implemented in an equivalent manner to attenuate other light rays. For example, in alternative embodiments, the polarizer angle may be determined to attenuate incident light rays resulting from surface reflections.

For the sake of brevity, conventional techniques related to polarization, polarizing filters, photography, device packaging, and other functional aspects of the subject matter may not be described in detail herein. In addition, certain terminology may be used herein for the purpose of reference only, and thus are not intended to be limiting. For example, the terms "first," "second," and other such numerical terms referring to structures do not imply a sequence or order unless clearly indicated by the context, and terms such as "upper," "lower," "top," "bottom," and the like refer to directions in the drawings to which reference is made. The foregoing description also refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although a schematic shown in the figures may depict direct electrical connections between circuit elements and/or terminals, alternative embodiments may employ intervening circuit elements and/or components while functioning in a substantially similar manner.

In conclusion, systems, devices, and methods configured in accordance with example embodiments of the invention relate to:

An apparatus for an electronic device is provided. The electronic device comprises one or more sensing arrangements, a polarization arrangement including a polarizer, and a control module coupled to the one or more sensing arrangements and the polarization arrangement to determine an angle for the polarizer based at least in part on output from the one or more sensing arrangements and operate the polarization arrangement to achieve the angle. In one embodiment, the angle of the polarizer corresponds to an orientation of the polarizer configured to absorb directly incident light rays from the sun. In another embodiment, the electronic device further comprises an image capturing device, wherein the polarizer is aligned in a line-of-sight with the image capturing device, and the angle of the polarizer corresponds to an orientation of the polarizer in a plane substantially orthogonal to the line-of-sight. In another embodiment, the one or more sensing arrangements including an acceleration sensing arrangement, wherein the control module is coupled to the acceleration sensing arrangement to determine a tilt of a line-of-sight aligned with the polarizer based on a measured acceleration output from the acceleration sensing arrangement and determine the angle for the polarizer based at least in part on the tilt. In one embodiment, the electronic device further comprises a positioning system providing a geographic location of the electronic device, wherein the control module is coupled to the positioning system to determine a solar position relative to the line-of-sight based on the geographic location and the tilt, and determine the angle for the polarizer based on the solar position. In another embodiment, the one or more sensing arrangements include a magnetic sensing arrangement, wherein the control module is coupled to the magnetic sensing arrangement to determine a heading of a line-of-sight aligned with the polarizer based on a measured magnetic field output from the magnetic sensing arrangement and determine the angle for the polarizer based at least in part on the heading. In one embodiment, the electronic device further comprises a positioning system providing a geographic location of the electronic device, wherein the control module is coupled to the positioning system to determine a solar position relative to the line-of-sight based on the geographic location and the heading and determine the angle for the polarizer based on the solar position. In another embodiment, the one or more sensing arrangements include an acceleration sensing arrangement, wherein the control module is coupled to the acceleration sensing arrangement to determine a tilt of the line-of-sight based on a measured acceleration output from the acceleration sensing arrangement and determine the angle for the polarizer based at least in part on the heading and the tilt. In a further embodiment, the electronic device further comprises an image capturing device, wherein the line-of-sight is aligned with the image capturing device and the angle of the polarizer corresponds to an orientation of the polarizer in a plane substantially orthogonal to the line-of-sight. In one embodiment, the angle for the polarizer is configured to absorb polarized light rays from the sun. In a further embodiment, the electronic device further comprises a positioning system providing a geographic location of the electronic device, wherein the control module is coupled to the positioning system to determine a solar position relative to the line-of-sight based on the geographic location, the heading, and the tilt, determine a polarization angle for the polarized light rays from sun based on the solar position relative to the line-of-sight, and determine the angle for the polarizer that absorbs the polarization angle.

In yet another embodiment, the polarization arrangement includes a motor coupled to the polarizer, the motor is configured to rotate the polarizer, and the control module operates the motor to achieve the angle.

In another exemplary embodiment, an apparatus for an electronic device includes an image capturing device having a line-of-sight, one or more sensing arrangements, a polarization arrangement including a polarizer aligned in the line-of-sight, and a control module coupled to the one or more sensing arrangements and the polarization arrangement. The control module determines an orientation of the line-of-sight based at least in part on output from the one or more sensing arrangements, determines an angular position for the polarizer in a plane orthogonal to the line-of-sight based at least in part on the orientation of the line-of-sight, and operates the polarization arrangement to achieve the angular position. In one embodiment, the polarization arrangement includes a motor coupled to the polarizer and the motor is configured to rotate the polarizer in the plane orthogonal to the line-of-sight, where the control module operates the motor to achieve the angular position. In another embodiment, the one or more sensing arrangements include a magnetic sensing arrangement coupled to the control module, wherein the control module determines a heading of the line-of-sight with respect to Earth based on a measured magnetic field output from the magnetic sensing arrangement and determines the angular position based at least in part on the heading. In a further embodiment, the one or more sensing arrangements also include an acceleration sensing arrangement coupled to the control module, wherein the control module determines a tilt of the line-of-sight with respect to the earth based on a measured acceleration output from the acceleration sensing arrangement and determines the angular position based at least in part on the tilt and the heading. In a further embodiment, the electronic device further comprises a positioning system providing a geographic location of the electronic device, wherein the control module is coupled to the positioning system to determine a solar position relative to the line-of-sight based on the geographic location, the heading, and the tilt and determine the angular position for the polarizer based on the solar position, and the angular position corresponds to an orientation of the polarizer in the plane that is configured to absorb polarized light rays emanating from the solar position.

An exemplary method of operating a polarizer associated with an electronic device is also provided. The method comprises determining a first orientation of a line-of-sight aligned with the polarizer based at least in part on output from one or more sensing arrangements and adjusting a second orientation of the polarizer in a plane orthogonal to the line-of-sight in a manner that is influenced by the first orientation. In one embodiment, the electronic device includes an acceleration sensing arrangement and a magnetic sensing arrangement, wherein determining the first orientation comprises obtaining a measured acceleration from the acceleration sensing arrangement, determining a tilt of the line-of-sight based on the measured acceleration, obtaining a measured magnetic field from the magnetic sensing arrangement, and determining a heading of the line-of-sight based on the measured magnetic field, and adjusting the second orientation comprises adjusting the second orientation of the polarizer based at least in part on the tilt and the heading of the line-of-sight. In another embodiment, adjusting the second orientation comprises obtaining a geographic location of the electronic device, determining a solar position relative to the electronic device based at least in part on the geographic location, determining an angle between the solar position and the first orientation, determining a polarization angle for light rays emanating from the solar position based on the angle, and rotating the polarizer in the plane orthogonal to the line-of-sight to absorb the polarization angle.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. An electronic device comprising:
    an acceleration sensing arrangement;
    a polarization arrangement including a polarizer; and
    a control module coupled to the acceleration sensing arrangement and the polarization arrangement to:
        determine a tilt of a line-of-sight aligned with the polarizer based on a measured acceleration output from the acceleration sensing arrangement;
        determine an angle for the polarizer based at least in part on the tilt; and
        operate the polarization arrangement to achieve the angle.

2. The electronic device of claim 1, wherein the angle of the polarizer corresponds to an orientation of the polarizer configured to absorb directly incident light rays from the sun.

3. The electronic device of claim 1, further comprising an image capturing device, wherein:
    the polarizer is aligned in a line-of-sight with the image capturing device; and
    the angle of the polarizer corresponds to an orientation of the polarizer in a plane substantially orthogonal to the line-of-sight.

4. The electronic device of claim 1, further comprising a positioning system providing a geographic location of the electronic device, wherein the control module is coupled to the positioning system to:
    determine a solar position relative to the line-of-sight based on the geographic location and the tilt; and
    determine the angle for the polarizer based on the solar position.

5. The electronic device of claim 1, wherein:
    the polarization arrangement includes a motor coupled to the polarizer;
    the motor is configured to rotate the polarizer; and
    the control module operates the motor to achieve the angle.

6. An electronic device comprising:
    a magnetic sensing arrangement;
    a polarization arrangement including a polarizer; and
    a control module coupled to the magnetic sensing arrangement and the polarization arrangement to:
        determine a heading of a line-of-sight aligned with the polarizer based on a measured magnetic field output from the magnetic sensing arrangement;
        determine an angle for the polarizer based at least in part on the heading; and operate the polarization arrangement to achieve the angle.

7. The electronic device of claim 6, further comprising a positioning system providing a geographic location of the electronic device, wherein the control module is coupled to the positioning system to:
   determine a solar position relative to the line-of-sight based on the geographic location and the heading; and
   determine the angle for the polarizer based on the solar position.

8. The electronic device of claim 6, further comprising an acceleration sensing arrangement, wherein the control module is coupled to the acceleration sensing arrangement to:
   determine a tilt of the line-of-sight based on a measured acceleration output from the acceleration sensing arrangement; and
   determine the angle for the polarizer based at least in part on the heading and the tilt.

9. The electronic device of claim 8, further comprising an image capturing device, wherein:
   the line-of-sight is aligned with the image capturing device; and
   the angle of the polarizer corresponds to an orientation of the polarizer in a plane substantially orthogonal to the line-of-sight.

10. The electronic device of claim 9, wherein the angle for the polarizer is configured to absorb polarized light rays from the sun.

11. The electronic device of claim 10, further comprising a positioning system providing a geographic location of the electronic device, wherein the control module is coupled to the positioning system to:
   determine a solar position relative to the line-of-sight based on the geographic location, the heading, and the tilt;
   determine a polarization angle for the polarized light rays from the sun based on the solar position relative to the line-of-sight; and
   determine the angle for the polarizer that absorbs the polarization angle.

12. An electronic device comprising:
   an image capturing device having a line-of-sight;
   a polarization arrangement including a polarizer aligned in the line-of-sight;
   a magnetic sensing arrangement; and
   a control module coupled to the magnetic sensing arrangement and the polarization arrangement to:
      determine a heading of the line-of-sight with respect to Earth based on a measured magnetic field output from the magnetic sensing arrangement;
      determine an angular position for the polarizer in a plane orthogonal to the line-of-sight based at least in part on the heading; and
      operate the polarization arrangement to achieve the angular position.

13. The electronic device of claim 12, wherein:
   the polarization arrangement includes a motor coupled to the polarizer; and
   the motor is configured to rotate the polarizer in the plane orthogonal to the line-of-sight, the control module operating the motor to achieve the angular position.

14. The electronic device of claim 12, further comprising an acceleration sensing arrangement coupled to the control module, the control module determining a tilt of the line-of-sight with respect to the earth based on a measured acceleration output from the acceleration sensing arrangement and determining the angular position based at least in part on the tilt and the heading.

15. The electronic device of claim 14, further comprising a positioning system providing a geographic location of the electronic device, wherein:
   the control module is coupled to the positioning system to:
      determine a solar position relative to the line-of-sight based on the geographic location, the heading, and the tilt; and
      determine the angular position for the polarizer based on the solar position; and
   the angular position corresponds to an orientation of the polarizer in the plane that is configured to absorb polarized light rays emanating from the solar position.

16. A method of operating a polarizer associated with an electronic device including an acceleration sensing arrangement and a magnetic sensing arrangement, the polarizer being aligned with a line-of-sight, the method comprising:
   obtaining a measured acceleration from the acceleration sensing arrangement;
   determining a tilt of the line-of-sight based on the measured acceleration;
   obtaining a measured magnetic field from the magnetic sensing arrangement;
   determining a heading of the line-of-sight based on the measured magnetic field; and
   adjusting an orientation of the polarizer in a plane orthogonal to the line-of-sight based at least in part on the tilt and the heading of the line-of-sight.

17. A method of operating a polarizer associated with an electronic device, the polarizer being aligned with a line-of-sight, the method comprising:
   determining a first orientation of the line-of-sight based at least in part on output from one or more sensing arrangements;
   obtaining a geographic location of the electronic device;
   determining a solar position relative to the electronic device based at least in part on the geographic location;
   determining an angle between the solar position and the first orientation;
   determining a polarization angle for light rays emanating from the solar position based on the angle; and
   rotating the polarizer in a plane orthogonal to the line-of-sight to absorb the polarization angle.

* * * * *